United States Patent [19]

Engelen et al.

[11] Patent Number: 5,501,184
[45] Date of Patent: Mar. 26, 1996

[54] MOTOR VEHICLE HAVING A COMMON LIQUID SUPPLY FOR A LIQUID-COOLED DRIVE ENGINE AND HYDRAULIC POWER STEERING

[75] Inventors: Helmut Engelen; Horst Nikl, both of Wolfsburg, Germany

[73] Assignee: Volkswagen AG, Wolfsburg, Germany

[21] Appl. No.: 351,677

[22] Filed: Dec. 8, 1994

[30] Foreign Application Priority Data

Dec. 16, 1993 [DE] Germany .......................... 43 42 983.1

[51] Int. Cl.$^6$ ...................................................... F01P 3/00
[52] U.S. Cl. ............................................................ 123/41.29
[58] Field of Search .......................... 123/41.11, 41.12, 123/41.49, 41.29

[56] References Cited

U.S. PATENT DOCUMENTS 3,659,567  5/1972  Murray .................................. 123/41.12
3,934,644  1/1976  Johnston .............................. 123/41.49

FOREIGN PATENT DOCUMENTS 0268173  5/1988  Germany .
0283803  9/1988  Germany .
3127476  9/1990  Germany .

Primary Examiner—Noah P. Kamen
Attorney, Agent, or Firm—Brumbaugh, Graves, Donohue & Raymond

[57] ABSTRACT

A motor vehicle having a liquid-cooled engine and a hydraulic power steering arrangement has a single liquid reservoir and a single pump which supply coolant both to a liquid-coolant circuit for the engine and to the hydraulic power steering arrangement.

3 Claims, 1 Drawing Sheet

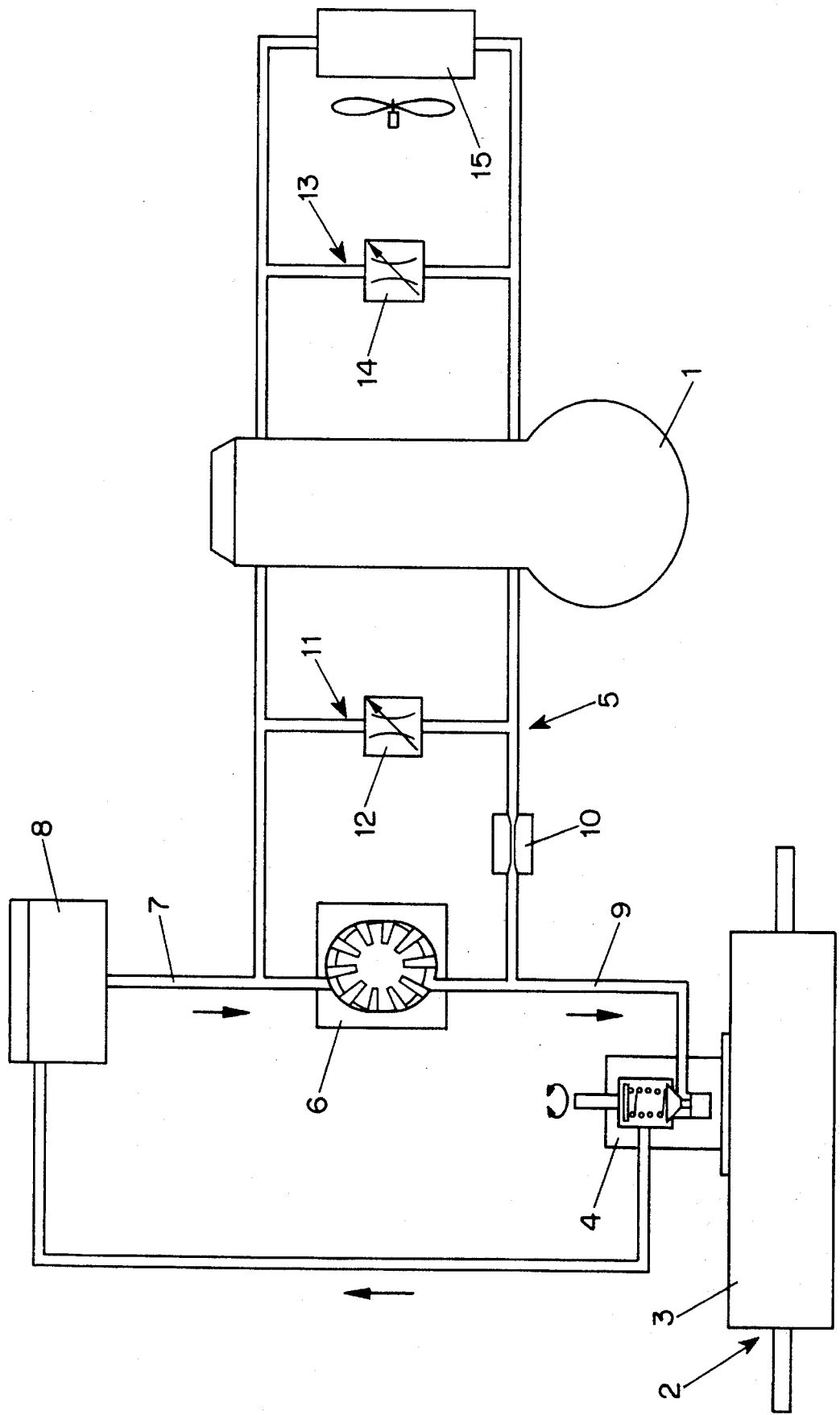

MOTOR VEHICLE HAVING A COMMON LIQUID SUPPLY FOR A LIQUID-COOLED DRIVE ENGINE AND HYDRAULIC POWER STEERING

BACKGROUND OF THE INVENTION

This invention relates to motor vehicles having a liquid-cooled drive engine and hydraulic power steering.

In conventional internal combustion engines, liquid cooling of the engine generally utilizes a liquid coolant mixture and a liquid pump is used to circulate the coolant. As a rule, such liquid-cooling arrangements include a thermostat-controlled bypass in a circuit leading to a liquid/air heat exchanger. In this way, the cooling action can be adjusted in accordance with the engine temperature. Until the engine becomes hot, the bypass in the circuit is open so that the coolant is bypassed from the heat exchanger and, therefore, is hardly cooled at all. At high coolant temperatures, the bypass is closed and, consequently, the coolant passes through the heat exchanger.

On the other hand, motor vehicles having conventional hydraulic power steering arrangements include another liquid circuit supplied with hydraulic oil and require another pump, which is usually a vane pump. In German Patent No. 31 27 476 and in European Patent Application No. 0 283 803, excess oil pumped by a power steering pump is used to drive other hydraulic components, such as servo-braking installations, anti-skid brake-slip installations (ABS), vehicle level-adjusting installations, and hydraulic arrangements for operating the fork of a forklift truck. Thus, in all of these cases, the hydraulic fluid supplied for the power steering arrangement is also supplied to other force-generating arrangements. It is furthermore known in such cases, as described, for example, in European Patent No. 0 268 173, to provide priority valves arranged to assure that the hydraulic power steering arrangement is supplied with hydraulic fluid in a preferential fashion.

SUMMARY OF THE INVENTION

Accordingly, it is an object of the present invention to provide a motor vehicle having a liquid supply system for cooling the engine and for the power steering arrangement of the vehicle which overcomes the disadvantages of the prior art.

Another object of the invention is to provide such a vehicle in which the cost of liquid supply circuits therein is reduced.

These and other objects of the invention are attained by providing a motor vehicle having a liquid-cooled engine and a hydraulic power steering arrangement with a common liquid reservoir and a common pump to supply a coolant mixture to both the engine and the power steering arrangement.

In accordance with the invention, therefore, the common pump serves to supply the same liquid to two liquid-flow circuits which are operated with different liquids in conventional vehicles since both circuits must meet very different requirements, i.e., the coolant circuit operates at a relatively low pressure but requires a liquid which not only possesses a relatively low viscosity throughout the temperature range involved, that is, between cold temperatures in the winter and high temperatures during full-load operation at the height of summer, but also insures good heat transfer, while, in contrast, the power steering arrangement normally requires a hydraulic oil maintained during operating stages at a relatively high pressure level by means of a vane pump.

In view of these very different requirements, the invention resulted from extensive investigations carried out to solve the problems encountered in providing a common liquid supply. These investigations originally sought to accomplish multiple utilization of other auxiliary units in internal combustion engines. For example, it would be conceivable to take advantage of the existing lubricating oil pump of an internal combustion engine in order to provide the hydraulic pressure medium supply for the power steering. As was shown by the results, the operating fluid flow rate is indeed sufficient in that case, but the hydraulic pressure levels required for the power steering arrangement were not achieved. Conversely, one could consider using the vane pump of the power steering arrangement in order to supply the internal combustion engine with lubricating oil. However, this was found to present difficulties with respect to contamination by oil sludge and because of the mechanical wear in the internal combustion engine. In order to overcome these negative effects on the power steering arrangement, additional and expensive steps would be required.

Another possibility would be to connect a gear pump for the liquid-cooling system to the power steering pump. However, this would require an auxiliary arrangement to insure the liquid supply since gear pumps are not self-priming and there would be no improvement so far as efficiency is concerned.

In this connection, combining liquid-cooling and power steering systems according to the invention provides an optimum solution, particularly since the liquid cooling medium generally contains corrosion inhibitors and, moreover, the liquid circuits for cooling and power steering must be completely sealed.

BRIEF DESCRIPTION OF THE DRAWING

Further objects and advantages of the invention will be apparent from a reading of the following description in conjunction with the accompanying drawing, which is a schematic block diagram illustrating a representative embodiment of a motor vehicle having a liquid supply system for engine cooling and for hydraulic steering arranged in accordance with the invention.

DESCRIPTION OF PREFERRED EMBODIMENT

In the typical embodiment of a motor vehicle according to the invention schematically shown in the drawing, an internal combustion engine 1 is of conventional structure and therefore will not be described in detail. For the same reason, the cooling channels in the cylinder block and in the cylinder head of the engine are not illustrated and need not be described.

The motor vehicle furthermore has a conventional power steering arrangement 2, including a working piston 3 and a cylindrical rotary valve liquid to both the power steering the vehicle. Such power steering arrangements are known in the prior art.

In order to supply liquid to both the power steering arrangement 2 and a liquid coolant circuit 5 of the vehicle, a vane pump 6 is connected through a supply line 7 to receive liquid from a reservoir 8. The reservoir 8 holds a coolant such as a glycol/water mixture selected to satisfy the requirements of both the temperatures that are encountered in liquid cooling of the engine 1 and the pressure levels that must be achieved in the power steering arrangement 2. It has been found that the optimum coolant mixture for this purpose consists of about 50 parts glycol and about 50 parts water.

The vane pump 6 supplies liquid directly through a pressure line 9 to the power steering arrangement 2 at a relatively high pressure, which is required for the operation of the power steering arrangement. On the other hand, the liquid supplied from the pump 6 to the liquid coolant circuit 5 passes through a pressure-reducing arrangement 10 which may constitute, for example, a throttle. In the illustrated embodiment, a first bypass 11, located in the coolant circuit ahead of the internal combustion engine 1 in the direction of coolant flow, has a first thermostat valve 12, which opens the bypass 11 during cold-start of the engine. As a result, the coolant in the cooling channels of the internal combustion engine 1 is warmed relatively quickly. After the coolant temperature has risen to the level at which the thermostat valve 12 closes the first bypass 11, the coolant is circulated through the cooling channels of the internal combustion engine 1 by the pump 6. A second bypass 13, however, is maintained open at this time by a second thermostat valve 14 located in that bypass and responsive at a higher temperature level than the first thermostat valve 12 so that the coolant that leaves the internal combustion engine 1 is conveyed through the bypass 13 back to the return line 7 to the pump 6, bypassing a liquid/air heat exchanger 15 and therefore remaining essentially uncooled. When the engine temperature reaches the higher operating level at which the second thermostat valve 14 is responsive, that valve closes the second bypass 13 and the coolant flows through the heat exchanger 15 to provide a full cooling effect to the engine.

In accordance with the invention, therefore, a single supply of liquid and a single pump are connected to operate both the power steering arrangement and the engine cooling circuit. In other words, the additional liquid pump and the additional liquid reservoir required in conventional motor vehicles are eliminated.

Although the invention has been described herein with reference to a specific embodiment, many modifications and variations therein will readily occur to those skilled in the art. Accordingly, all such variations and modifications are included within the intended scope of the invention.

We claim:

1. A motor vehicle comprising a drive engine, a liquid-cooling circuit for the engine arranged to circulate coolant at a first pressure level, a hydraulic power steering arrangement having a pressure line to receive liquid supplied at a second pressure level higher than the first pressure level, pressure control means for establishing a pressure difference between the first and second pressure levels, a liquid reservoir for holding coolant to be supplied both to the liquid-cooling circuit for the engine and to the pressure line at the second pressure level, and a pump for circulating coolant to both the liquid-cooling circuit for the engine and to the pressure line.

2. A motor vehicle according to claim 1 wherein the reservoir contains coolant comprising about 50 parts glycol and about 50 parts water.

3. A motor vehicle according to claim 1 wherein the pressure control means is in the liquid-cooling circuit and includes means for reducing the pressure of the coolant supplied by the pump.

* * * * *

UNITED STATES PATENT AND TRADEMARK OFFICE
CERTIFICATE OF CORRECTION

PATENT NO. : 5,501,184
DATED : March 26, 1996
INVENTOR(S) : Engelen et al.

It is certified that error appears in the above-indentified patent and that said Letters Patent is hereby corrected as shown below:

<u>Column 2, line 57</u>, "valve liquid to both the power steering" should read --valve 4 coupled to the steering wheel of--.

Signed and Sealed this

Twenty-seventh Day of August, 1996

Attest:

BRUCE LEHMAN

*Attesting Officer*   *Commissioner of Patents and Trademarks*